May 31, 1955  A. Y. DODGE  2,709,505
INTERNAL EXPANDING WHEEL BRAKE
Filed Nov. 22, 1949  3 Sheets-Sheet 2
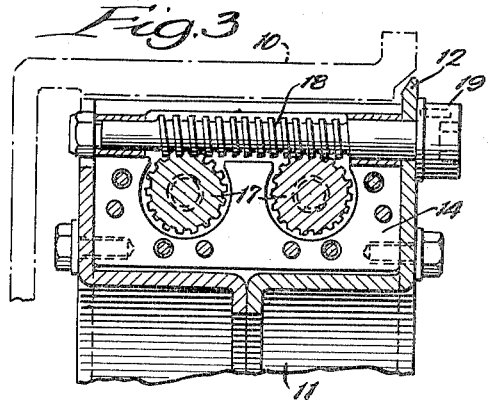
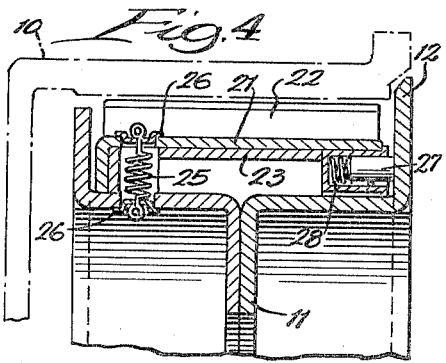
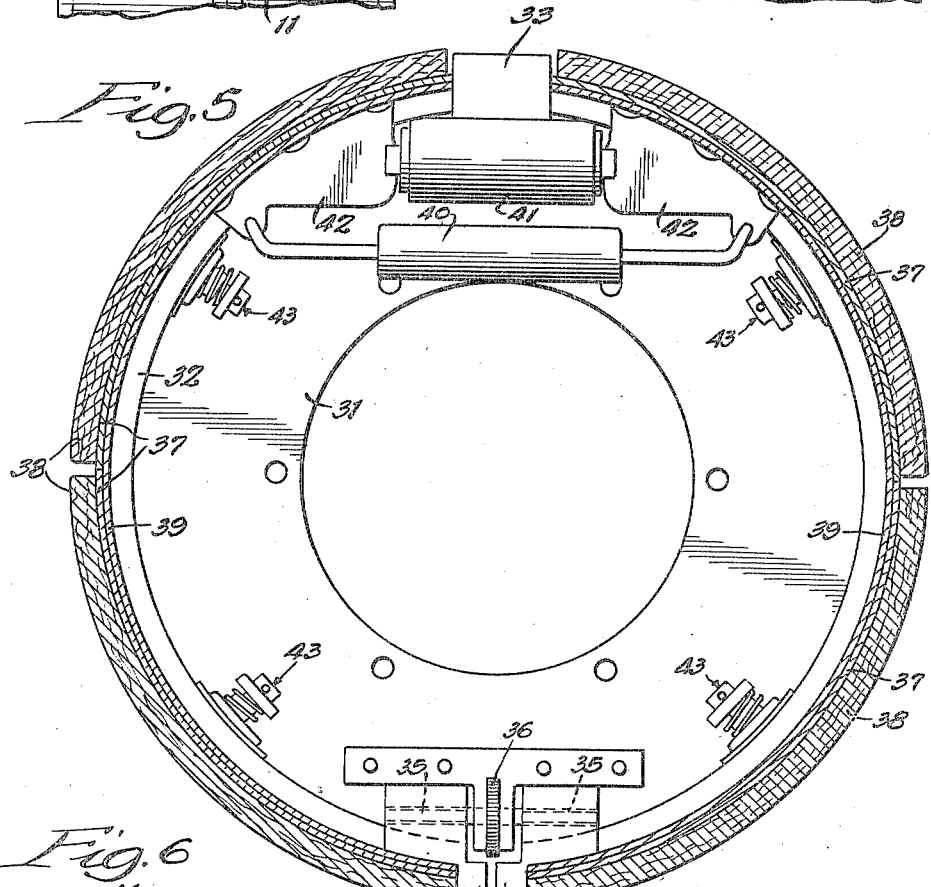
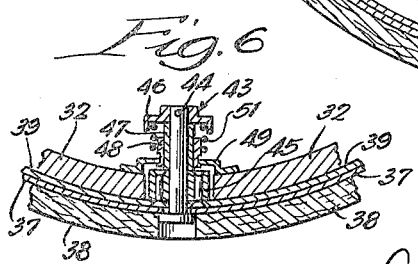
INVENTOR:
Adiel Y. Dodge,
BY Dawson, Ooms, Booth and Spengenberg,
ATTORNEYS.

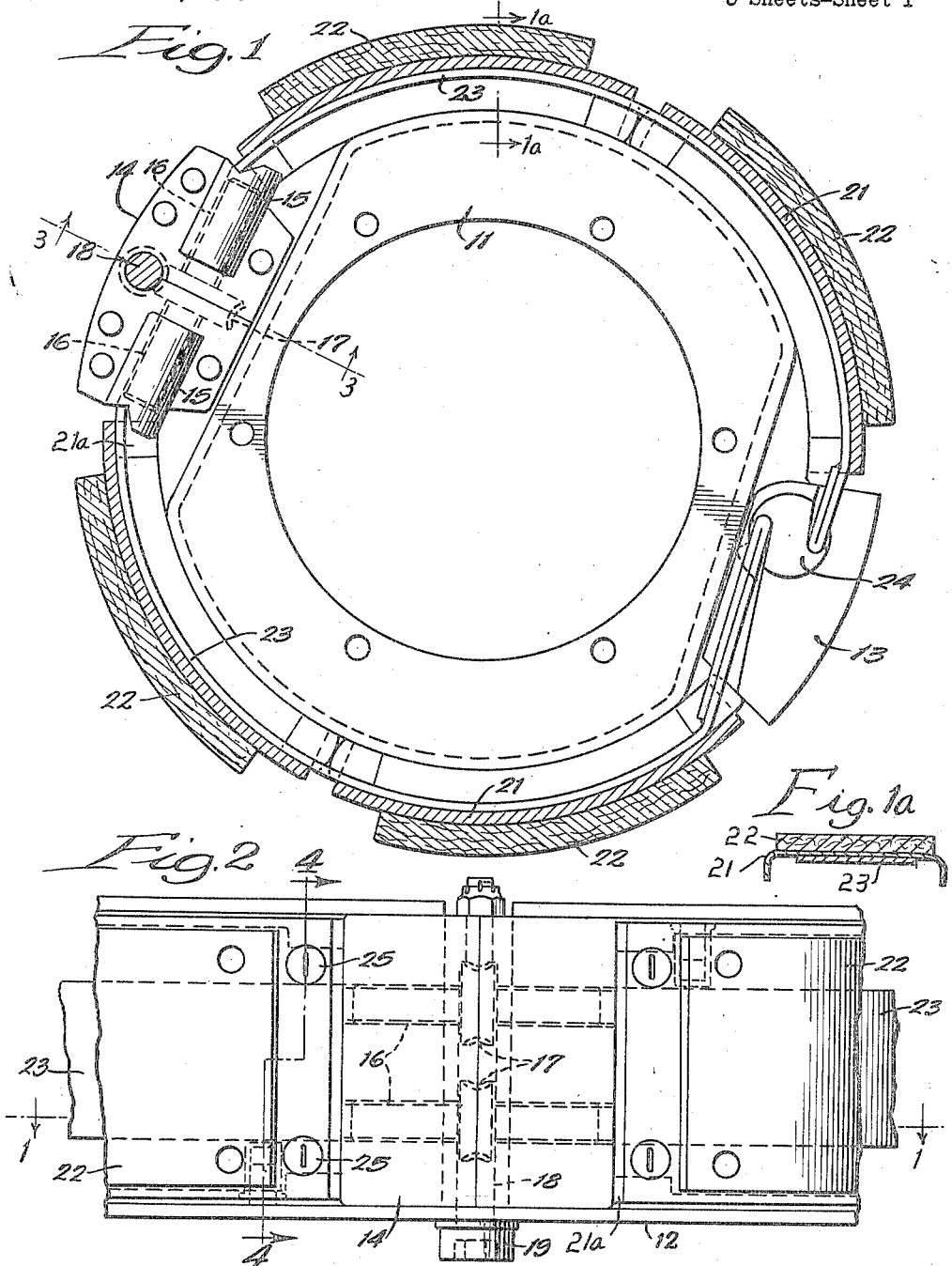

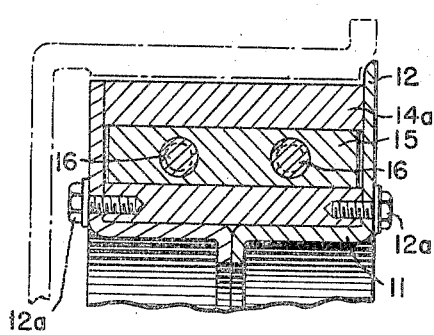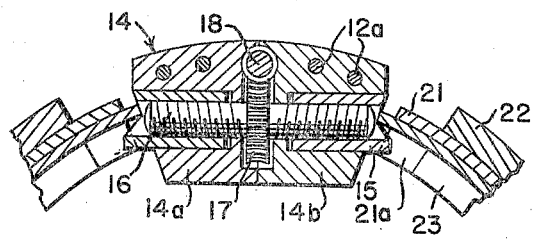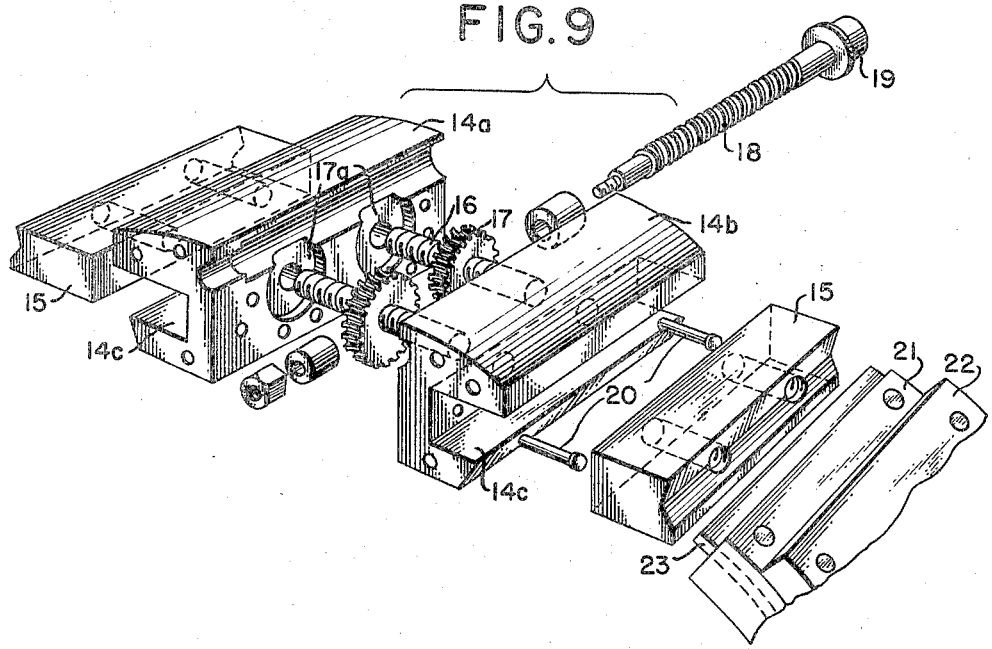

United States Patent Office 2,709,505
Patented May 31, 1955

2,709,505

INTERNAL EXPANDING WHEEL BRAKE

Adiel Y. Dodge, Rockford, Ill.

Application November 22, 1949, Serial No. 128,805

15 Claims. (Cl. 188—78)

This invention relates to brakes and more particularly to friction brakes for use with cylindrical brake drums.

One of the objects of the invention is to provide a brake in which a plurality of segments or shoes are arranged in series between spaced abutments to provide a servo action of one shoe on the following shoe. Preferably, two shoes are arranged in end to end engagement between abutments to provide a similar servo effect in either direction of rotation.

Another object is to provide a brake in which a single adjusting means serves to adjust both the shoes or segments and the operating means therefor. According to one feature the adjusting means includes a pair of tangentially adjustable parts against which both the shoes or segments and the ends of flexible operating bands abut.

A specific object is to provide a brake in which the shoes are of channel section with the channels opening inward and the operating means comprises a flexible band or bands lying within the shoe channels.

A further object is to provide a brake in which the shoes are urged inward by tension springs connected to the corner portions of the shoes and to channel section supports. Preferably, the ends of the springs are connected to the web portions of the channel shaped shoes and the channel shaped support and lie within the shoe channels.

A still further object is to provide a brake in which radial movement of the shoes is frictionally limited by friction members carried by the shoes for radial lost motion relative thereto and which frictionally engage the sides of the channel section support.

The above and other objects and advantages of the invention will be more readily apparent when read in connection with the accompanying drawings, in which—

Figure 1 is a transverse radial section of a brake designed for relatively heavy duty and embodying the invention taken on the line 1—1 of Figure 2;

Figure 1A is a partial section on the line 1A—1A of Figure 1;

Figure 2 is a partial side elevation of the brake;

Figure 3 is a section through the abutment adjusting means on the line 3—3 of Figure 1;

Figure 4 is a section on the broken line 4—4 of Figure 2;

Figure 5 is a view similar to Figure 1 of a brake for relatively lighter duty;

Figure 6 is a section through one of the return spring devices of Figure 5;

Figure 7 is a transverse section parallel to the section of Figure 3 but displaced tangentially therefrom; Figure 8 is a partial axial section through one of the screws 16; and Figure 9 is a partial disassembled view showing the adjustable abutment structure.

The brake of the present invention is adapted to be used with a cylindrical brake drum as indicated at 10 in dotted lines in Figures 3 and 4. The brake drum may be connected to rotate with a vehicle wheel in the usual manner, and the brake mechanism of the present invention cooperates with the drum to resist rotation.

The brake, as shown, comprises an annular support 11 adapted to be fixedly mounted adjacent to the brake drum to lie within the brake drum, as seen in Figures 3 and 4. At its outer edge the support 11 terminates in a channel section 12 opening radially outward and registering with the inner cylindrical surface of the drum. As shown, the support is made up of two plates offset at their outer edges to provide the channel section and connected together in face to face relationship.

At diametrically spaced points the support 11 carries a pair of abutments, one of which as shown at 13, is formed by a block fitting in the channel support and rigidly secured thereto. The opposite abutment indicated generally at 14 is formed, as best seen in Figures 7 to 9, of a pair of blocks 14a and 14b fitting into the channel support 12 and secured in place therein by screws extending through the sides of the support as shown at 12a. The blocks 14a and 14b are formed with slots 14c extending across their outer faces which slidably receive adjustable abutment members 15.

The abutment members 15 are adjusted tangentially and are held in adjusted position by screws 16 which are oppositely threaded at their opposite ends into threaded bores in the abutments 15. The screws 16 are turned by worm gears 17 rigidly secured to the central portions of the screws. To hold the screws in place the inner faces of the blocks 14a and 14b are recessed as shown at 17a to receive the gears 17. The blocks 14a and 14b may be held together by tension fastenings such as rivets 20 in addition to their connection to the support 12.

The two gears 17 mesh with a worm 18 which is journalled in recesses in the faces of the blocks 14a and 14b and which terminates in a wrench receiving head 19 beyond one side of the channel frame 12. By turning the worm the abutments may be moved tangentially in the slots 14c to any desired extent to adjust the brake.

A series of rigid shoes are mounted between the abutments, and preferably each of the shoes is identical with the others. Each shoe comprises a channel shaped supporting plate 21 of a size to seat within the channel 12 with its side flanges extending inward so that the shoe channel opens inward. Friction lining material 22 is mounted on the outer surface of each of the shoes to engage the drum 10 when the shoes are moved radially outward. The side flanges of the shoes 21 adjacent to the abutment 14 preferably span the adjustable abutments 15 and are formed with enlargements 21a which engage the abutments. In addition the web of the shoes 21 may engage the ends of the abutments 15 which may be shaped as shown for that purpose.

In the preferred arrangement, as shown in Figure 1, two shoes in end to end engagement are mounted between the abutments on opposite sides thereof. With this construction the friction drag on the leading shoe with respect to the direction of rotation of the drum will force the leading shoe against the trailing shoe to impart an expanding force to the trailing shoe. The trailing end of the trailing shoe will engage one or the other of the abutments depending upon the direction of rotation so that a very effective servo action is produced regardless of the direction of rotation. It will be noted that the end of one shoe of each series engages the fixed abutment 13 while the end of the other shoe of each series engages one of the adjustable abutment parts 15. As best seen in Figure 2 the flanges of the channel 21 may be formed with enlargements 21a at their ends which engage the ends of the abutments 15. Thus by adjusting the parts 15 the radial position of the shoes can be adjusted to provide the desired amount of clearance between the shoes and the drum. In this way wear of the friction lining can easily be compensated for.

The shoes are expanded outward into engagement with the drum by operating means comprising a pair of flexible bands or strips 23. According to one feature of the invention the flexible bands or strips 23 lie within the shoe channels and are accurately located thereby. One end of each of the bands 23 engages the outer end of one of the adjustable abutments 15, and the other ends of the bands are adapted to be spread by an actuating device which may be mechanical or hydraulic or of another desired type. As shown in Figure 1, the actuating device comprises a rotatable shaft member 24 having diametrically opposed recesses to receive the ends of the bands 23. When the shaft or cam member 24 is turned counter-clockwise, the ends of the bands will be separated to expand the bands radially and to move the shoes outward.

The shoes are urged inward by tension springs 25 which, as best seen in Figure 2, are mounted adjacent the corners of the shoes. As shown in Figure 4, the tension springs may have their ends secured to washers 26 which fit over openings in the web portions of the shoes and of the channel shaped support so that the springs lie within the shoe channels. This provides a very compact and efficient arrangement which is extremely simple to manufacture and assemble.

Radial movement of the shoes is limited and is automatically adjusted by friction members 27 carried by the shoes and projecting laterally therefrom to engage the sides of the channel shaped support, as best seen in Figure 4. The friction members 27 are mounted in tubular elements carried by the shoes and are of smaller diameter than the tubular elements to provide for radial lost motion between them and the shoes. Springs 28 urge the friction members into engagement with the sides of the support.

In normal operation the lost motion between the friction members and the shoes is sufficient to accommodate radial movement of the shoes so that when the shoes move the friction members remain fixed with respect to the support 12. However, as the lining wears and the radial movement of the shoes exceeds that permitted by the lost motion, the friction members will be slid outward to new positions relative to the support. The frictional holding force of these members is greater than the force exerted by the springs 25 so that the shoes will move inward an amount equal to the lost motion. In this way the clearance between the drum and the shoes is maintained substantially constant under all operating conditions.

When the lining wear becomes relatively large the operating means and the shoes may be adjusted to compensate for it through the adjustable abutments 15. Adjustment of these abutments outward will not only adjust the tangential shoe clearance to maintain it at a desired minimum value but will also expand the operating bands to minimize the amount of turning of the cam member 24 and accordingly to adjust the amount of pedal travel required for a brake application. Thus, with one simple adjustment wear can easily and accurately be compensated for.

The brake of Figures 5 and 6 is more particularly described in my copending application Serial No. 725,369, filed January 30, 1947 now Patent No. 2,633,939 issued April 7, 1953, of which this application is a continuation in part.

The construction shown in Figures 5 and 6 is particularly adapted for relatively lighter duty service such, for example, as passenger car use. This brake includes a backing plate or support 31 which is adapted to be mounted in a cylindrical drum similar to the drum 10 of Figures 3 and 4 and which includes a cylindrical flange portion 32 lying concentrically within the drum. The flange portion 32 carries a fixed abutment 33 and an adjustable abutment formed by tangentially movable blocks 34 diametrically opposite the abutment 33. The blocks 34 may be moved by a screw 35 having its end portions formed with threads of opposite hand which are threaded into the blocks respectively. The screw may be turned in any desired manner as, for example, by a knurled wheel 36. When the wheel 36 is turned, the blocks 34 will be spread tangentially or moved tangentially together.

Two pairs of brake segments are arranged between the abutments on opposite sides thereof, each segment, as shown, comprising a flexible metal strip 37 carrying a friction lining 38. The outer ends of the segments of each pair engage the fixed abutment 33 and one of the abutment blocks 34, while the adjacent ends of the segments engage each other, as shown.

The segments are adapted to be moved outward into frictional contact with the drum by operating means shown as comprising flexible bands 39 underlying the segments and supported by the annular flange 32. The operating means may be in the form of two band sections each of which is of sufficient length to extend from the fixed abutment to one of the adjustable abutment parts 34. The ends of the bands adjacent the fixed abutment 33 may be spread by an actuating means shown as a hydraulic cylinder 41 having a pair of pistons therein which respectively engage vanes 42 on the band ends. The segments and the operating band may be urged toward the support by return spring devices at 40 and 43 which may, if desired, be constructed as more particularly described and claimed in my copending application Serial No. 693,642, filed August 29, 1946, now Patent No. 2,596,379, to provide for automatic adjustment of clearance.

One of the return spring devices 43 is illustrated in detail in Figure 6. As shown, the device comprises a pin 44 having an enlarged head which secures it to the segment strip 37 and which extends through an opening in the operating band 39. Preferably, a block 45 is secured to the operating band and extends loosely through an opening in the support 32 so that limited circumferential movement of the band relative to the support is permissible. At its outer end the pin 44 rigidly carries a washer or stop plate 46 and has a friction sleeve 47 thereon between the stop plate and the block 45. A collar 48 has a relatively tight frictional engagement with the sleeve 47 and is formed with a peripheral groove loosely receiving a supporting plate 49. The clearance between the supporting plate and the groove is made equal to the desired initial brake clearance. A compression spring 51 engaging the supporting plate 49 and the washer 46 urges the pin outward.

When the brake is in its released position, the spring will urge the pin 44 inward to move the segments and the operating band toward the support and away from the drum. This movement is limited by engagement of the groove in the collar 48 with the stop plate 49. During normal application when the operating band and segments move outward, the free movement between the groove in the collar 48 and the supporting plate 49 will just be taken up. However, as the lining wears, the segments and operating band will move outward further causing the inner edge of the groove in the collar to engage the stop plate after which the collar will slide on the friction sleeve 47 to a new position. Upon release of the brake, the segments and operating bands move to the extent permitted by the free movement between the stop plate and the groove in the collar, the friction between the collar and the friction sleeve 47 being greater than the force exerted by the spring 51. In this way the clearance will be maintained constant in spite of lining wear.

In operation of this brake when actuating fluid is supplied to the cylinder 41 to spread the pistons, the band ends will be separated to expand the band outward radially. The band will engage the segments and move them outward into frictional contact with the drum. The first or primary shoe of each pair will transmit tangential force to the secondary shoe to produce a servo action approximating the effect of a half wrap action to produce an extremely efficient braking effect.

As lining wear occurs, the abutment blocks 34 may be spread to maintain the clearance constant and to eliminate circumferential clearance between the segment ends and the abutments thereby to reduce or prevent clicking. Adjustment of the blocks will also serve to adjust the band bosses thereby to prevent loss of pedal due to wear. When the return spring devices 43 are formed to provide automatic adjustment of clearance, this is not necessary, and the band may be continuous from one connecting vane 42 to the other. It will be noted that the operation of the band so far as braking is concerned is the same whether the band is continuous or separated into two sections.

While two embodiments of the invention have been shown and described in detail herein, it will be understood that they are illustrative only and are not to be taken as a definition of the scope of the invention, reference being had for this purpose to the appended claims.

What is claimed is:

1. A brake for use with a cylindrical brake drum comprising a support adapted to be mounted in the drum, a pair of abutments fixedly carried by the support at circumferentially spaced points, a plurality of brake segments in series fitting loosely between the abutments to have a limited circumferential lost motion relative thereto with the outer ends of the end segments engaging the abutments and the adjacent ends of adjacent segments engaging each other, expansible operating means carried by the support radially within the segments to engage the segments and move them radially outward into contact with the drum, actuating means to expand the operating means, one of the abutments being expansible circumferentially, means connecting between the operating means and the expansible abutment to expand the operating means when the abutment is expanded, and means adjustably to expand said one of the abutments thereby to take up circumferential lost motion between the segments and the abutments.

2. A brake for use with a cylindrical brake drum comprising a support adapted to be mounted in the drum, a fixed abutment carried by the support, an adjustable abutment fixedly carried by the support spaced diametrically from the fixed abutment and including a pair of tangentially adjustable parts and means to hold the parts in adjusted position against tangential movement, two series of brake segments between the fixed abutment and the parts respectively with adjacent ends of adjacent segments in each series engaging each other, a pair of operating members engaging the abutment parts respectively at one end, and actuating means to spread the other ends of the operating members thereby to expand the operating members and the segments radially.

3. A brake for use with a cylindrical brake drum comprising a support adapted to be mounted in the drum, a fixed abutment carried by the support, an adjustable abutment fixedly carried by the support spaced diametrically from the fixed abutment and including a pair of tangentially adjustable parts and means to hold the parts in adjusted position against tangential movement, two series of brake segments between the fixed abutment and the parts respectively with adjacent ends of adjacent segments in each series engaging each other, a pair of flexible operating bands underlying the segments and engageable with the abutment parts respectively at one end, and means to spread the other ends of the bands adjacent the fixed abutment.

4. A brake for use with a cylindrical brake drum comprising a support, a pair of diametrically spaced abutments on the support, two series of rigid brake segments between the abutments with adjacent ends of adjacent segments in each series engaging each other, each of the segments being channel shaped with its side flanges extending inward, a pair of flexible operating bands one lying within the channels of the segments of each series with one end of each band engaging one of the abutments, and actuating means acting on the other ends of the bands to expand the bands and segments radially.

5. A brake for use with a cylindrical brake drum comprising a support, a pair of diametrically spaced abutments on the support, two series of rigid brake segments between the abutments with adjacent ends of adjacent segments in each series engaging each other, each of the segments being channel shaped with its side flanges extending inward, one of the abutments including a pair of tangentially adjustable parts and means to hold the parts in adjusted position against tangential movement, a pair of flexible operating bands lying within the channels of the segments with one end of each band engaging one of said parts, means to spread the parts to adjust the segments and bands, and actuating means engaging the other ends of the bands to separate them thereby to expand the bands and segments radially.

6. A brake comprising an annular channel section support opening radially outward and adapted to fit in a cylindrical brake drum, a plurality of brake shoes movably mounted in annular array in the channel support for radial movement into contact with the drum, the shoes being of channel section opening inward, and operating means for the brake shoes mounted in the channel support radially within the shoes, the operating means including a radially expansible mechanism lying at least partially within the channel section of the shoes and separated at its ends, and actuating means carried by the support to separate the ends of said mechanism.

7. A brake comprising an annular channel section support opening radially outward and adapted to fit in a cylindrical brake drum, a plurality of brake shoes movably mounted in annular array in the channel support for radial movement into contact with the drum, the shoes being of channel section opening inward, operating means lying at least partially within the channel section of the shoes to urge the shoes radially outward, and tension return springs connected to the corner portions of the shoes and the support to urge the shoes radially inward.

8. A brake comprising an annular channel section support opening radially outward, a plurality of brake shoes movably mounted in the channel support for radial movement therein, the shoes being of channel section opening inward, a flexible operating band lying within the channel section of the shoes, and actuating means to expand the band thereby to move the brake shoes radially outward.

9. A brake comprising an annular channel section support opening radially outward, a plurality of brake shoes movably mounted in the channel support for radial movement therein, the shoes being of channel section opening inward, a pair of spaced abutments on the support engaging the brake shoes to limit circumferential movement thereof, a pair of flexible operating bands lying within the channels of the shoes with one end of each band engaging one of the abutments, and actuating means acting on the other ends of the bands to expand the bands and segments radially.

10. A brake comprising an annular channel section support opening radially outward, a plurality of brake shoes movably mounted in the channel support for radial movement therein, the shoes being of channel section opening inward, a pair of diametrically spaced abutments on the support engaging the brake shoes to limit circumferential movement thereof, one of the abutments including a pair of tangentially adjustable parts, a pair of flexible operating bands lying within the channels of the shoes with one end of each band engaging one of the abutment parts, means to spread the parts to adjust the bands and segments radially, and actuating means to spread the other ends of the bands to expand them radially.

11. A brake comprising an annular channel section support opening radially outward, a plurality of brake shoes movably mounted in the channel support for radial movement therein, the shoes being of channel section opening inward, a flexible operating band lying within the channels of the shoes, actuating means to expand the band and shoes radially, and tension return springs connected to the corner portions of the shoes and the support to urge the shoes radially inward.

12. A brake comprising an annular channel section support opening radially outward, a plurality of brake shoes movably mounted in the channel support for radial movement therein, the shoes being of channel section opening inward, a flexible operating band lying within the channels of the shoes, actuating means to expand the band and shoes radially, return springs urging the shoes radially inward, friction members carried by the shoes for radial lost motion relative thereto and projecting laterally therefrom, and springs urging the members into engagement with the sides of the support frictionally to limit radial movement of the shoes.

13. A brake comprising an annular channel section support opening radially outward, a plurality of brake shoes movably mounted in the channel support for radial movement therein, the shoes being of channel section opening inward, a flexible operating band lying within the channels of the shoes, actuating means to expand the band and shoes radially, tension return springs lying within the shoe channels and connected to the web portions of the shoes and support adjacent the corners of the shoes, friction members carried by the shoes for radial lost motion relative thereto and projecting laterally therefrom, and springs urging the friction members into engagement with the sides of the support frictionally to limit radial movement of the shoes.

14. A brake for use with a cylindrical brake drum comprising a support adapted to be mounted in the drum, a pair of circumferentially spaced abutments carried by the support, brake segment means carried by the support for radial movement thereon into and out of engagement with the drum, a flexible operating band loosely underlying the brake segment means to move it radially into engagement with the drum, the brake segment means and the band lying loosely between and being engageable at their ends with the abutments to have their circumferential movement limited by the abutments, operating means adjacent to one of the abutments to move the adjacent end of the operating band tangentially to engage the other end of the band with the other abutment and expand the band radially, tangentially adjustable parts carried by one of the abutments and engaging the adjacent ends of the segment means and the band simultaneously to adjust the clearance of the segment means and the band, and manually operable means to adjust the parts.

15. A brake for use with a cylindrical brake drum comprising a support adapted to be mounted in the drum, a pair of circumferentially spaced abutments carried by the support, brake segment means carried by the support for radial movement thereon into and out of engagement with the drum, a flexible operating band loosely underlying the brake segment means to move it radially into engagement with the drum, the brake segment means and the band lying loosely between and being engageable at their ends with the abutments to have their circumferential movement limited by the abutments, operating means adjacent to one of the abutments to move the adjacent end of the operating band tangentially to engage the other end of the band with the other abutment and expand the band radially, tangentially extending threaded adjustment parts carried by one of the abutments and engageable with the adjacent ends of the segment means and the band simultaneously to adjust the clearance of the segment means and the band, and threaded members carried by said one of the abutments and threaded on the parts to adjust the parts.

References Cited in the file of this patent

UNITED STATES PATENTS

| Number | Name | Date |
|---|---|---|
| 1,994,813 | Dodge | Mar. 19, 1935 |
| 2,045,010 | Goepfrich | June 23, 1936 |
| 2,045,882 | Stromgren | June 30, 1936 |
| 2,133,669 | Pratt et al. | Oct. 18, 1938 |
| 2,202,661 | Jeffery | May 28, 1940 |
| 2,348,960 | Cowell | May 16, 1944 |
| 2,506,201 | Farkas | May 2, 1950 |

FOREIGN PATENTS

| Number | Country | Date |
|---|---|---|
| 256,461 | Great Britain | Aug. 12, 1926 |